Figure 1:
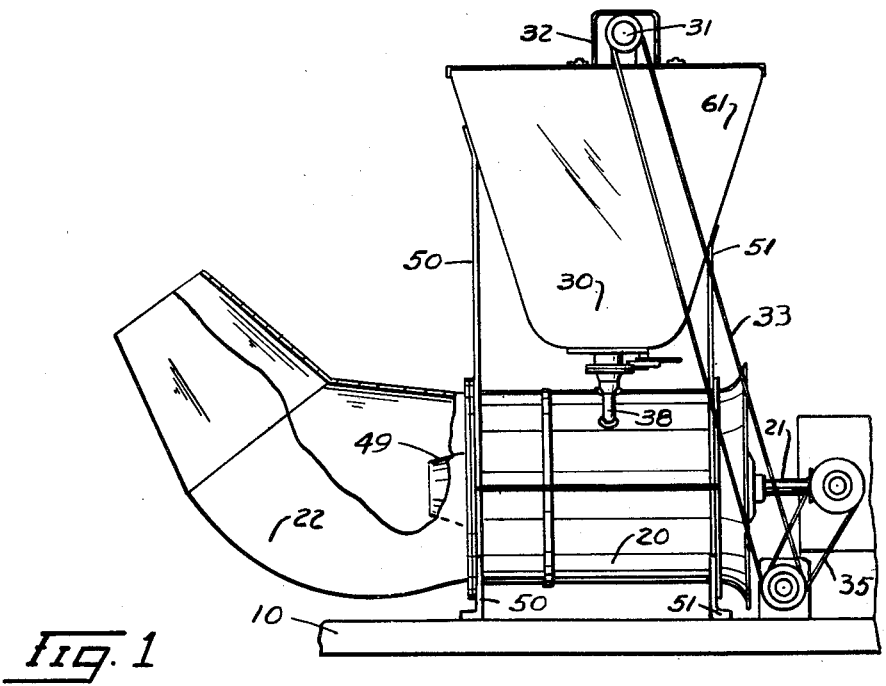

June 20, 1950 J. G. SAWYER 2,512,175
APPARATUS FOR DELIVERING PULVERIZED
AND SIMILAR MATERIALS
Filed March 27, 1947 4 Sheets-Sheet 1

INVENTOR.
JAMES G. SAWYER
BY
Bates, Teare, & McBean
ATTORNEYS

INVENTOR.
James G. Sawyer
BY
Bates, Teare, & McBean
ATTORNEYS

Patented June 20, 1950

2,512,175

UNITED STATES PATENT OFFICE 2,512,175

APPARATUS FOR DELIVERING PULVERIZED
AND SIMILAR MATERIALS

James G. Sawyer, Williamsville, N. Y., assignor to Buffalo Turbine Agricultural Equipment Co., Inc., Gowanda, N. Y., a corporation of New York Application March 27, 1947, Serial No. 737,673

23 Claims. (Cl. 302—52)

1

This invention relates to an apparatus for delivering pulverized or similar material. The invention includes means for feeding such material from a bin containing the same, and the combination of the bin with a blowing apparatus receiving the discharge from the bin and delivering it with a discharged air blast.

Preferably, I employ a turbine blower, and I mount the bin above the blower and provide mechanism for gradually feeding the material in the bin downwardly into the air stream developed in the blower. I arrange the discharge from the dust bin into the blower in such manner that the air blast not only receives the dust mechanically fed from the bin but acts pneumatically to draw it from the conduits discharging into the blower. The above and other features contributing to the effective operation of the device are fully explained in the following description of a preferred embodiment illustrated in the drawings.

Figure 2:
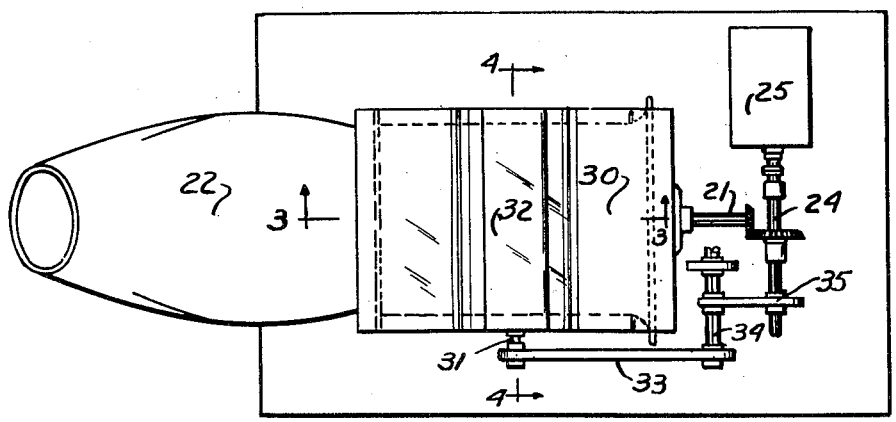
Figure 3:
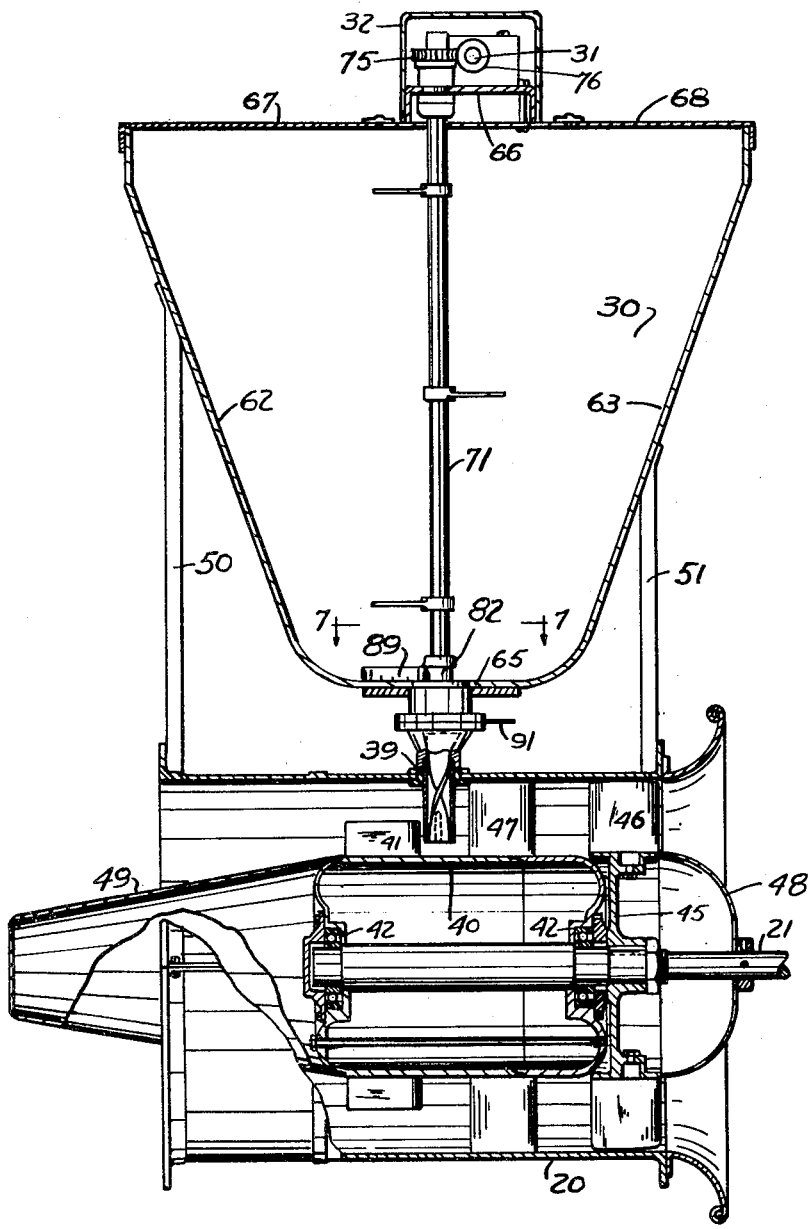
Figure 4:
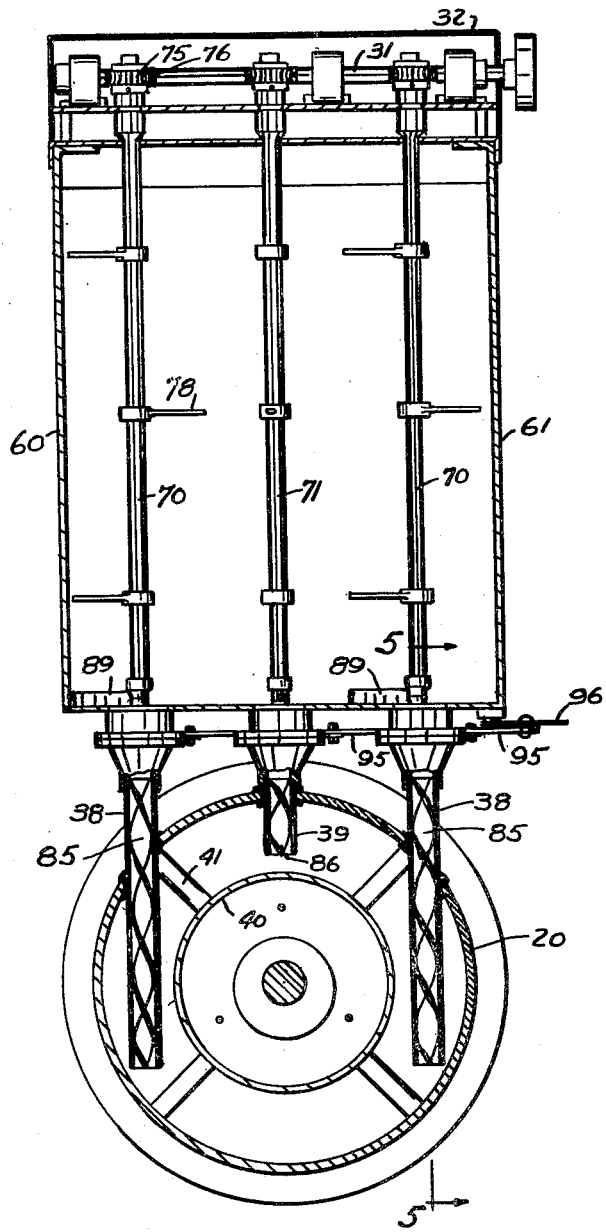
Figure 5:
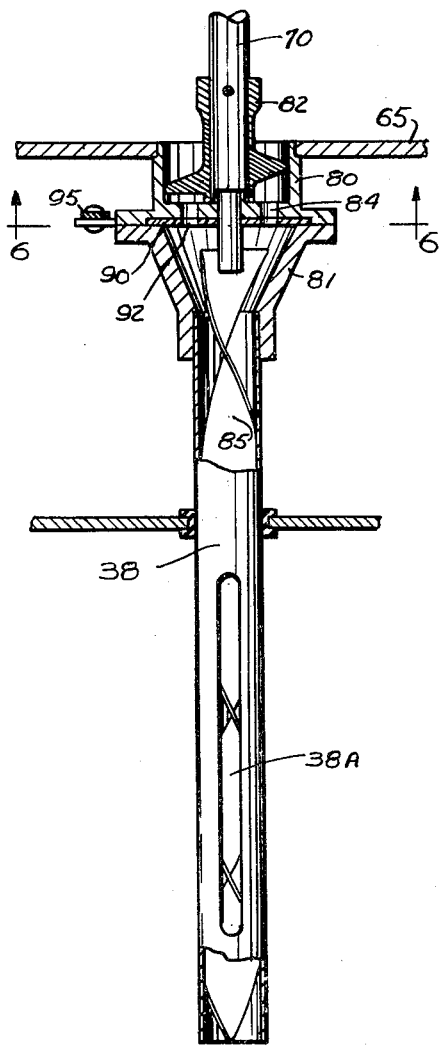
Figure 6:
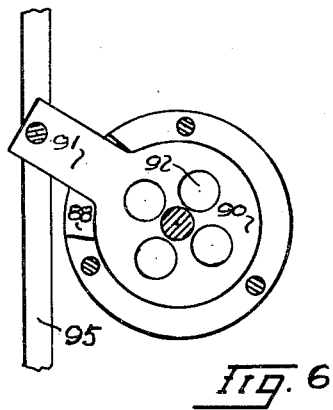
Figure 7:
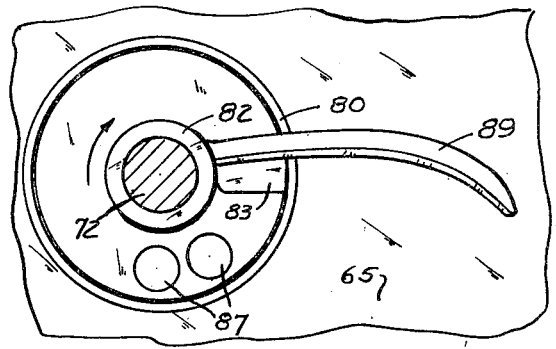

In the drawings, Fig. 1 is a side elevation, partly broken away, of one embodiment of my dust delivering apparatus; Fig. 2 is a plan thereof; Fig. 3 is a vertical section through the dust bin and through the axis of the blower, as indicated by the line 3—3 on Fig. 2; Fig. 4 is a vertical section through the dust bin in a plane at right angles to Fig. 3, as indicated by the line 4—4 on Fig. 2; Fig. 5 is a sectional side elevation of one of the discharge conduits from the dust bin to the blower, showing also parts of the mechanical feed for the dust and its controlling gate, this view is in the nature of a vertical section on the line 5—5 on Fig. 4; Fig. 6 is a plan of the dust gate, being in the nature of a horizontal section looking upwardly on the line 6—6 on Fig. 5; Fig. 7 is a sectional plan on the line 7—7 on Fig. 3 on a larger scale.

Referring first to Figs. 1 and 2, 10 designates a suitable platform which may be stationary or the platform of a vehicle, as desired. Mounted on this platform is a turbine blower having an external shell 20, and directly above it a dust bin 30 adapted to discharge into the blower. The blower has a rotary impeller on a shaft 21 and serves to take in air from the right hand end in Figs. 1 and 2 and discharge it out through a discharge conduit 22 terminating in a nozzle of any desired shape and direction.

The blower shaft 21 is shown as bevel geared to a main driving shaft 24 operated by a suitable motor or engine 25. The dust bin feed is operated by a transverse shaft 31 in a housing 32 above the dust bin proper. This shaft 31 is

2 shown as carrying a belt pulley connected by a belt 33 to a pulley on a lay shaft 34 which is connected by a belt 35 to a pulley on the main driving shaft 24.

Accordingly, the same motor operates the impeller of the blower to force a tubular air stream along the blower to the discharge nozzle and also the feed to force the pulverized material in the dust bin downwardly into the air stream, such downward passageway being by means of vertical conduits which extend from the dust bin downwardly into the shell of the blower. One of these conduits appears in Fig. 1 as 38, but their operation will be more apparent from the Figs. 3, 4 and 5 as hereinafter explained.

The present invention is not concerned with the details of the blower per se, as the same are fully explained and claimed in a copending application of mine Ser. No. 737,672, filed March 27, 1947. Briefly, however, the blower shown has the following characteristics.

This blower, as shown more particularly in Figs. 3 and 4, comprises a cylindrical shell designated 20, and an internal drum 40 supported by radial bars 41 extending inwardly from the shell, this drum carrying at its ends bearings 42 for the blower shaft 21. On the blower shaft is a rotary impeller hub 45 having blades 46. Between these blades and the radial supports 41 is an annular row of straightening vanes 47. A suitable shield 48 on the shaft directs the incoming air in annular form to the blades 46 and a shield 49 on the drum 40 directs the outgoing tube of air into the discharge conduit 22.

The blower shown has a pair of end supporting brackets 50 and 51 secured to end flanges on the blower shell and secured at their lower ends to the platforms 10. Upward extensions of these brackets support the dust bin.

The dust bin is of a hopper form. It is shown as having parallel vertical walls 60 and 61 in planes extending longitudinally of the blower, and inwardly inclined walls 62 and 63 in planes obliquely transverse of the blower axis. These inclined walls adjacent the bottom preferably curve gradually into a flat bottom portion 65 which carries the downward discharge conduits 38 and 39 heretofore mentioned. At the top of the dust bin in the central region I provide a fixed transverse supporting beam 66 for the feed-drive mechanism, and on opposite edges thereof I hinge or otherwise secure movable lids 67, 68 to allow ready insertion of the pulverized material of the bin.

I have referred to the conduits extending downwardly from the bin. These comprise two comparatively long tubular members 38 and an intermediate shorter member 39. These all extend through the shell 20 into the annular air space about the drum 40, the long conduits lying at the opposite side of the drum, the short conduit directly above the drum, as shown in Fig. 4. The three conduits are in the same transverse plane, which, as shown in Fig. 3, is located between the straightening vanes 47 and the drum supports 41. Each tube is longitudinally slotted along opposite sides, as indicated at 38A in Fig. 5.

Axially aligned with the three discharge conduits 38, 39 and 38 are three vertical shafts 70, 71 and 70 (Fig. 4) which at their lower ends carry feeding mechanism hereinafter described. The upper ends of the shafts carry worm gears 75 meshing with worms 76 on the driving shaft 31 heretofore mentioned. Each of the shafts 70, 71 is provided, at several elevations in the bin, with radially projecting arms 78 to keep the material within the bin sufficiently agitated to make it flow readily.

At the bottom 65 of the bin are three cylindrical cups or sumps 80 which carry conical hoods 81 which support the tubular discharge conduits 38, 39. On each of the shafts 70, 71, which align with the axes of these discharge conduits, is a screw 82 within the corresponding sump serving to force the material downwardly through discharge openings 84 in the base of the sump. The screw 82 has somewhat less than a single turn so that there is a vertical open space indicated at 83, Fig. 7, for the downward discharge of the material. More space for the discharge may be provided by openings through the lowermost portion of the helical turn of the screw, as indicated at 87 in Fig. 7.

To insure the pulverized material in the bin passing into the respective sumps for feeding by the single turn screws 82, I provide a projecting arm 89 from the hub of each screw member 82. This arm is curved with its concave side forward in its direction of rotation, as shown in Fig. 7, so that as the shaft 70 or 71 rotates, this arm 89 lying close to the bottom 65 of the bin scrapes the material into position where it passes into the sump 80.

To the lower end of each shaft 70 is connected a long twisted blade 85 which occupies the corresponding tube 38, while a short twisted blade 86 is secured to the shaft 71 and occupies the tube 39. Each of these twisted blades has its helical edge close to the inner surface of the corresponding tube and thus serves to wipe the pulverized material into the slots 38A, and thus discharge it into the air blast. This is in addition to such discharge that may take place at the lower end of the tube.

An important point to be observed in regard to the discharge of the powdered material into the air blast is that the slots 38A in the vertical feeding tubes are located in planes transverse of the air blast, with the result that the air blast sweeps across the slots and thereby produces a suction effect acting to withdraw the material from the feeding tube. I thus force the material into the air blast both mechanically and pneumatically, with the result that it is effectively distributed into the tubular blast so as to be discharged intimately mingled with the air of the blast through the discharge conduit 22. This intimate mingling enables the air blast to carry the powdered material to great distances from the blower, which is very desirable in field operations.

As above stated the discharge from the bin is through a series of openings 84 at the bottom of each sump 80. To control this discharge I provide a perforated plate 90, Figs. 5 and 6, rotatably mounted in a circular space between the bottom of each sump and the top of the adjacent conical sleeve 81. A radial handle 91 extends from this circular gate through an arcuate opening 88 in the surrounding member. The openings 92 in the plate 90 correspond in number, position, and size to the openings 84—four being shown. Accordingly, in one position of the plate 90 the openings 84 may be unobstructed to allow the maximum feed through those openings. On the other hand, by slightly turning the plate 90 on its axis the discharge from the openings 84 is choked or may be shut off altogether.

The three gates 90 for the three discharge tubes 38 and 39 are preferably all connected together by a rod 95 which may be manually operated to position all of the gates simultaneously. By way of illustration, I have shown this rod 95 as linked to a manually operable lever 96 in Fig. 4.

It will be seen that I have provided by this invention a compact power-operated dust feeding and discharging apparatus which may if desired be conveniently mounted on a wheeled platform. A simple engine or motor mounted on the platform operates both the blower and the dust feeding mechanism. The location of the dust bin directly over the blower aids in the feeding of the dust to the air blast and economizes space on the platform. The dust bin is readily loaded, and the material therein is kept constantly in condition for feeding and is effectively fed by mechanical propulsion and by suction of the air blast into which it is discharged.

I claim:

1. The combination with a turbine blower adapted to deliver an annular air blast with means for feeding material into the annular air stream between the entrance and discharge of the blower said means comprising a tube extending into the annular space and a rotary screw in said tube.

2. The combination with a turbine blower adapted to deliver an annular air blast, a dust bin, a tube extending downwardly from the dust bin into the annular space of the air blast and means for feeding powdered material from the dust bin along said tube into the air blast between the entrance and discharge of the blower.

3. The combination of a blower having a shell, a rotary impeller with blades at the periphery within the shell and an annular row of straightening vanes in the shell beyond the impeller, a dust bin, means for conducting dust from the bin to the region within the blower beyond the straightening vanes.

4. The combination of a turbine blower having a horizontal tubular shell, a rotary impeller within the shell, a series of straightening vanes within the shell beyond the impeller, a dust bin above the shell, and a conduit leading downwardly from the dust bin into the shell to discharge pulverized material into the annular air blast in the blower.

5. In a dust spreading apparatus, the combination of a blower having an open-ended shell and a rotary impeller carrying a row of blades, an annular row of straightening vanes within the shell, a dust bin, a conduit from the dust bin to the annular space beyond the straightening vanes, and means for feeding the material from the dust bin through the conduit into the air space in the blower.

6. In a dust spreading apparatus, the combination of a platform, a blower thereon having a horizontal open-ended shell and a rotary impeller on a driving shaft carrying a row of blades, an annular row of straightening vanes within the shell, a dust bin supported above the shell, downwardly extending conduits from the dust bin to the annular space beyond the straightening vanes, mechanism for feeding the material downwardly from the dust bin through the conduits into the air space in the blower, and driving mechanism connected with such feeding mechanism and with the blower shaft.

7. The combination with a blower having an annular air space, of a dust bin having a discharge tube extending into the air space, said tube having a longitudinal slot so located that the propelled air passes externally across it, whereby such air produces a suction effect in the tube.

8. The combination of a blower having a horizontal shell and means for establishing an air blast in tubular form within the shell, a dust bin, a discharge tube extending from the dust bin into the annular air blast, said tube having a longitudinal slot through its wall in such position that the air blast passes across the slot, and means in the tube serving to wipe the material in the tube to the region of the slot.

9. The combination of a blower having a horizontal shell and means for establishing an air blast in tubular form within the shell, a dust bin above the blower, a set of discharge tubes extending from the dust bin downwardly into the annular air blast, said tubes having longitudinal slots through their walls in such position that the air blast passes across the slots, a set of vertical shafts aligned with the tubes, means on the lower ends of the shafts serving to wipe the material in the tubes in the region of the slots, and mechanism for rotating the shafts.

10. The combination of a blower having a horizontal shell and a bearing-supporting drum within the shell spaced from it, a shaft mounted in the bearings carried by the drum, an impeller on the shaft having blades adjacent the shell, a row of straightening vanes between the drum and shell, a dust bin above the shell, a set of vertical tubes extending downwardly from the dust bin into the annular space within the shell beyond the straightening vanes, said tubes having longitudinal slots in their walls located in a plane transverse of the drum axis, a set of vertical shafts aligned with the tubes, means within the tubes connected to the shafts for carrying the material therein into the region of the slots, and a common means for rotating said shafts.

11. The combination with a blower adapted to deliver an annular air blast, a dust bin, a tube for conducting pulverized material from the bin to the annular air space in the blower, means for forcing the material from the dust bin to the tube, and means for variably controlling the dust feed to the tube.

12. A dust bin adapted to carry pulverized material having a sump in its base, feeding screw in said sump having a longitudinal passageway through it, tubing extending from the said screw, and a rotary shaft carrying the screw.

13. A dust bin adapted to carry pulverized material and having a sump in its base, a feeding screw in said sump having a thread of less than a complete circumference to leave a longitudinal passageway through it, a rotary shaft carrying the screw, and a gathering arm carried by the shaft close to the bottom of the bin to bring the material into the sump.

14. The combination of a dust bin having a cylindrical sump at its bottom, said sump having a downward discharge opening, a rotary screw in the sump having a helical blade of less than a single turn to feed the material downwardly through the screw as the screw rotates, a projecting arm rigid with the screw and extending along the upper surface of the bottom of the bin, said arm being concave on its forward side and leading to the vertical opening between the ends of the helical screw thread.

15. The combination of a dust bin having a discharge tube, a rotary shaft aligned with the discharge tube, and a twisted blade on said shaft occupying the tube, the wall of the tube being longitudinally slotted, whereby the blade may wipe the material into the slot.

16. The combination of a dust bin adapted to carry pulverized material having an opening in its base, means for feeding the pulverized material to said opening, a tube beyond the opening adapted to receive the material so fed, means for feeding the material along the tube, and a movable gate between the feeding mechanism and tube to control the amount of material fed.

17. The combination of a dust bin adapted to contain pulverized material, a series of openings from the bottom of the dust bin, mechanism for forcing the material in the bin to said openings, a rotative gate having corresponding set of openings and adapted to register in varying degree with the openings at the base of the bin, and means for conducting the material beyond the gate.

18. The combination of a dust bin having a cylindrical sump at its base with annular set of openings in the bottom of the sump, a screw in the sump for forcing material downwardly through said openings, means for rotating the screw, a conduit beneath the openings for receiving the material fed, a rotative plate mounted between the sump and conduit and having openings adapted to register to a varying degree with the openings in the sump, and means for turning the plate about its axis.

19. The combination of a dust bin having a substantially cylindrical sump in its base, a discharge tube communicating with the sump and a rotary screw in the sump, said screw having a single thread of less than a complete circumference and serving to discharge material through the screw into the tube.

20. The combination of a dust bin having a sump at its bottom, a discharge tube connected to the sump, a screw in the sump, said screw having a hub extending above the sump and carrying a single thread of less than a complete circumference and serving to discharge material through the screw into the tube, an arm rigid with the hub and projecting laterally therefrom in position to coact with the bottom of the bin and means for rotating the screw.

21. The combination of a blower having a substantiallly cylindrical shell and an internal drum spaced therefrom to leave an annular air space, a dust bin above the blower, a tube leading downwardly from said dust bin into said annular space, and means for feeding material downwardly from the dust bin through said tube to said annular space.

22. The combination of a blower having a substantially cylindrical shell and an internal drum spaced therefrom to leave an annular air space, a dust bin above the blower having a substantially cylindrical sump in its base, a tube leading downwardly from said sump into said annular space, a rotary screw in the sump having a passageway through it, and means for rotating the screw to feed material downwardly from the dust bin to said annular space.

23. The combination with a blower, of a dust bin having a sump at its bottom, a longitudinally slotted discharge tube connected to the sump and leading into the air space of the blower, a rotary screw in the sump serving to discharge material into the tube, and a twisted blade in the tube rotating with the screw.

JAMES G. SAWYER.

REFERENCES CITED

The following references are of record in the file of this patent:

UNITED STATES PATENTS

| Number | Name | Date |
|---|---|---|
| 674,098 | Shepard | May 14, 1901 |
| 920,597 | Mallett | May 4, 1909 |
| 1,197,908 | Caracristi | Sept. 12, 1916 |
| 1,243,892 | Strong | Oct. 23, 1917 |
| 1,282,697 | Johnson | Oct. 22, 1918 |
| 1,348,885 | Laffoon | Aug. 10, 1920 |
| 1,454,979 | Muhlfeld et al. | May 15, 1923 |
| 1,693,880 | Wetmore | Dec. 4, 1928 |
| 1,733,749 | Patterson | Oct. 29, 1929 |
| 1,931,181 | Culver | Oct. 17, 1933 |
| 1,999,789 | Schmierer | Apr. 30, 1935 |
| 2,240,205 | Call | Apr. 29, 1941 |